United States Patent [19]
Yates

[11] Patent Number: 5,501,088
[45] Date of Patent: Mar. 26, 1996

[54] EXHAUST GAS DISCHARGE SYSTEM FOR A GAS ENGINE HEAT PUMP

[76] Inventor: Jan B. Yates, 1081 Matterhorn Dr., Reynoldsburg, Ohio 43068

[21] Appl. No.: 195,518

[22] Filed: Feb. 14, 1994

[51] Int. Cl.$^6$ ............................................... F28F 19/00
[52] U.S. Cl. ............................. 62/323.1; 62/296
[58] Field of Search ........................... 62/82, 89, 404, 62/272, 323.1, 324.1, 324.5, 296

[56] References Cited

U.S. PATENT DOCUMENTS

| | | | |
|---|---|---|---|
| 2,108,478 | 2/1938 | Eaker et al. | 62/116 |
| 2,180,915 | 11/1939 | Stebbins | 62/323.1 |
| 2,318,858 | 5/1943 | Hornaday | 62/323.1 |
| 2,416,153 | 2/1947 | Cary et al. | 62/323.1 |
| 2,892,322 | 6/1959 | Schelp | 62/314 |
| 3,139,924 | 7/1964 | Schreiner | 62/323.1 |
| 3,867,979 | 2/1975 | Carrasse et al. | 165/29 |
| 4,261,418 | 4/1981 | Helt et al. | 165/134 R |
| 4,510,762 | 4/1985 | Richarts | 62/79 |
| 4,811,569 | 3/1989 | Welch et al. | 62/239 |
| 5,029,449 | 7/1991 | Wilkinson | 62/175 |

*Primary Examiner*—Henry A. Bennett
*Assistant Examiner*—William C. Doerrler

[57] ABSTRACT

A heat pump system having an indoor unit and an outdoor unit, each unit having a refrigerant coil, a compressor and an engine forming a part of the outdoor unit and situated in an enclosure forming a part of an outdoor unit housing, a fan mechanism being adapted to draw ambient outdoor air over the outdoor refrigerant coil, the refrigerant coil and the fan mechanism being disposed in the second compartment of the housing, and an exhaust conduit for strategically directing engine exhaust gases into the downstream side of the airflow developed by the fan mechanism whereby fan noise, engine noise and exhaust gas odor are masked and wherein condensation caused by engine fuel combustion is disbursed in the discharge airstream.

6 Claims, 2 Drawing Sheets

EXHAUST GAS DISCHARGE SYSTEM FOR A GAS ENGINE HEAT PUMP

TECHNICAL FIELD

My invention relates to an engine-driven gas heat pump, particularly heat pumps adapted for residential use wherein an engine, a compressor, and an outdoor refrigerant coil are disposed in an outdoor unit and a coolant heat-recovery heat exchanger blower and refrigerant coil are located in an indoor unit, the indoor unit and the outdoor unit forming a part of a refrigerant and heat pump system circuit in heat exchange relationship.

BACKGROUND OF THE INVENTION

My invention comprises improvements in a residential heat pump system of the kind shown, for example, in U.S. Pat. No. 5,029,449, which is assigned to the assignee of my invention. It is an improvement also in the heat recovery method described in U.S. Pat. No. 4,510,762, which is assigned to H. Krantz, GmbH and Company of Germany.

The heat pump system of the '449 patent includes an outdoor unit and an indoor unit. The outdoor unit comprises an engine of the internal combustion type which drives a compressor. It includes also an outdoor refrigerant coil that receives the output of the compressor as a part of a refrigerant circuit. The controls include a thermal expansion valve and a fan powered by an electric motor for circulating ambient air across the outdoor coil.

The refrigeration and heat pump system uses ambient outside air as a heat sink for the cooling move and as a heat source when the system is operating in the heat pumping mode.

A residential heat pump that uses a gas engine to drive the compressor for the refrigerant may have an exhaust system that will recover waste heat from the exhaust and reduce exhaust noise to an acceptable level. Further, the exhaust system must either minimize condensation in the exhaust gases or properly dispose of the condensate if condensate is formed. Discharge of heat and odor from the exhaust should occur at a location that does not create an objectionable environment.

Exhaust noise from an engine-driven heat pump can be mitigated by a conventional muffler, but mufflers typically do not reduce the intensity of the noise to an acceptable level for most residential heat pump installations unless they are of a size that would make them impractical. Further, a typical muffler will not eliminate the distinctive noise signature (i.e., noise pulses) that are typical of a single cylinder gas engine heat pump.

If the outdoor coil is used with an outdoor fan that is driven by an electric motor, the fan noise can be used to mask engine exhaust noise to a certain extent, but the outdoor fan itself is somewhat noisy. If the fan were to be at a location that is not proximate to the exhaust, the engine exhaust noise may be a source of noise that is distinguishable from the background noise of the fan itself.

Condensation of water vapor in the engine exhaust also creates a concern. The exhaust condensate can be a source of heat if there were a practical means to extract it as is done in condensing furnaces. The outdoor location of the condensate, however makes disposal much more difficult than for a typical residential basement furnace. If a significant quantity of condensate is collected and disposed of outdoors during freezing weather, a large quantity of ice may be formed, which would be unacceptable. The condensate also is mildly acidic, and care must be taken to prevent corrosion of the heat pump housing and adjacent structural parts of the heat pump system.

In the past, it is known to provide engine exhaust outlet configurations for a gas engine heat pump wherein the exhaust gas discharge is mounted low on the outdoor cabinet or housing. This avoids direct corrosion of the heat pump from the moisture in the exhaust. Prevailing winds, however, may blow the exhaust back onto the cabinet, or the outdoor fan may draw exhaust through the heat exchanger. In cold weather, condensation may result which may create a corrosion problem. Further, condensation of water vapor on the refrigerant coil may occur. This may decrease performance and make it necessary to employ a defrost cycle more frequently. Also, the concentrated exhaust at ground level is a localized source of noise and odor that is Particularly noticeable to the persons near the residence.

Other known heat pump arrangements route the engine exhaust stream vertically downward across the face of the outdoor heat exchanger. The exhaust is drawn through the heat exchanger by the outdoor fan. Although the noise and odor are less objectionable with this arrangement, long-term corrosion of the heat exchanger and the associated parts presents a problem.

One design approach involves discharging the exhaust gases into the cavity between the outdoor heat exchange and the outdoor fan. This may mask the noise and odor since the exhaust gases enter the outdoor fan flow. It also may eliminate some of the corrosion concerns since the exhaust joins the airflow downstream of the heat exchanger. The cold air from the heat exchanger, however, may cause frosting of the fan and the protective grill. This may lead to corrosion of the parts, fan imbalance, and reduced airflow.

BRIEF DESCRIPTION OF THE INVENTION

The improvement of my invention overcomes the problems described in the preceding description. It comprises an exhaust system that routes exhaust gases from the engine so that the exhaust is mixed with the outdoor fan airflow at a point downstream from the fan and the protective grill for the fan. The exhaust gases then are entrained in the fan flow without coming into contact with the heat pump parts. Frosting and corrosion are eliminated. The exhaust sound is masked effectively by its proximity to the fan noise.

Odor is minimized because the exhaust gases are diluted with the fan flow and are directed upward and away from the observer. Also, the sound and the odor are less likely to be detected because the fan flow occurs at a location remote from the observer. By discharging the engine exhaust gases in this fashion, the two sources of noise (i.e., the engine exhaust and the fan) are at a common location, thereby making the two noise sources indistinguishable. A typical noise signature for a single cylinder heat pump gas engine is not detectable.

Any condensation that might occur during engine start-up or during cool running conditions which may be deposited on the heat pump cabinet can be reduced by maintaining the exhaust gases as hot as possible. This can be done by directing the engine exhaust duct through the warm engine compartment of the heat pump housing.

PARTICULAR DESCRIPTION OF THE INVENTION

When the heat pump is acting in its heating mode during typical cold-weather operation, the refrigerant is evaporated in the outdoor refrigerant coil to lower the temperature at the coil. As the outdoor air passes over the coil, heat is transferred from the air to the coil and into the refrigerant. When the outdoor air is cooled below its dew point as it passes over the coil, moisture from the air will collect on the surface of the coil. If the coil surfaces are below freezing, which occurs generally when the outdoor temperatures are below about 40° F., moisture will freeze on the outdoor coils.

If the heat pump installation includes a fan that pulls the air through the refrigerant coil and the fan is located downstream of the coil, the outdoor air passing over the fan blades and the protective grill is colder than the original ambient air and often is at 100% relative humidity. Since the air is not cooled any further as it passes the fan blades and the grill, no additional condensation or frosting should occur; but if additional water vapor from the engine exhaust is added to the airstream between the coil and the fan blades or grill, condensation and possible frosting will occur on the fan blades and the grill. This may produce icing of the fan blades, causing imbalance of the fan. Further, shedding of ice from the fan in large chunks may cause structural damage. Icing or frosting of the grill will adversely affect heat pump performance. All of these problems can be avoided by following the teachings of my invention.

The engine exhaust gases in a preferred embodiment of my invention are transferred through an exhaust duct and are discharged downstream from the fan blades and the grill to avoid the potential for icing. This will permit mixing of exhaust gas with the outdoor air fan discharge flow to mask noise, reduce odor and eliminate the visual signature of the exhaust.

Figure 1:
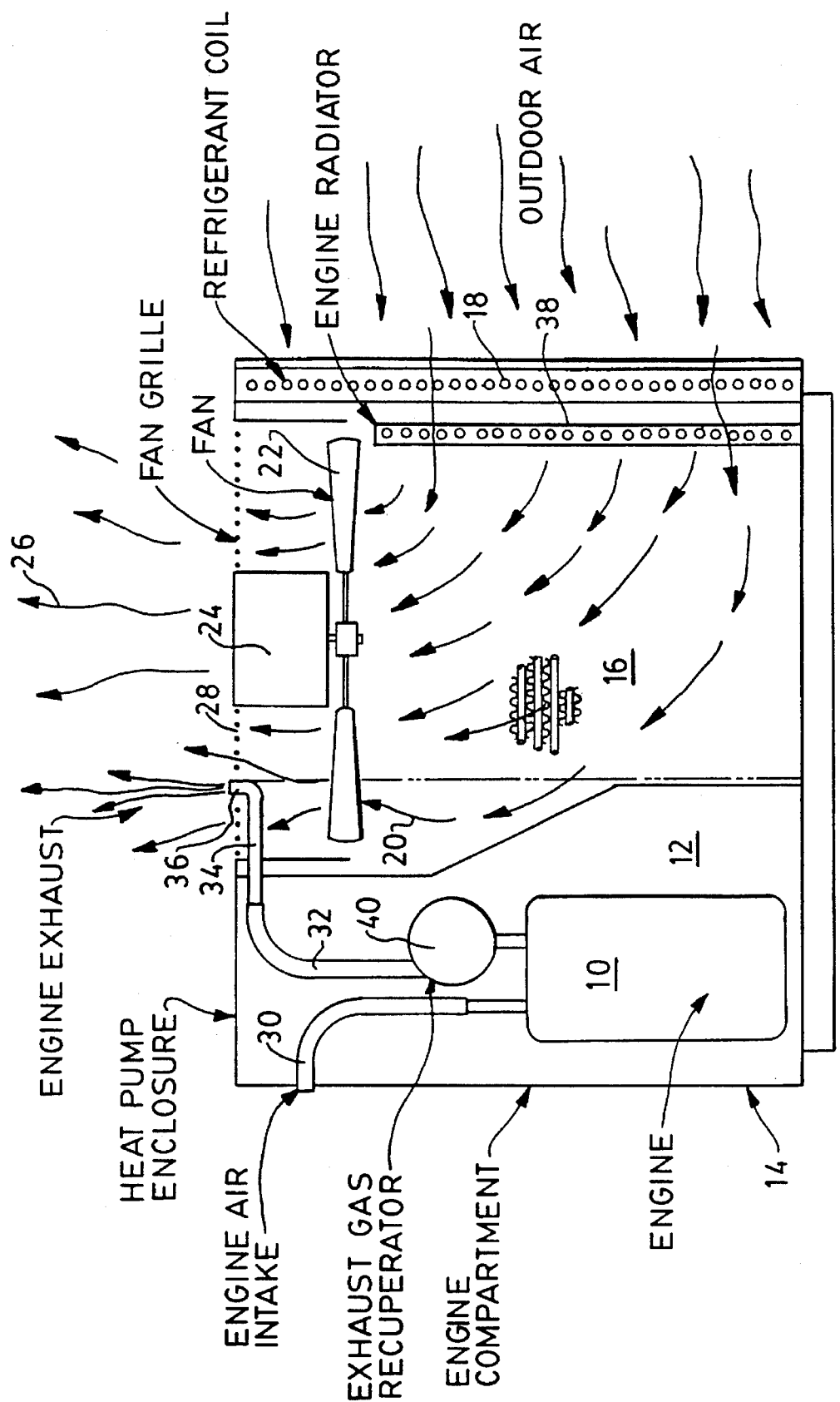
FIG. 1 is a schematic assembly view of an outdoor unit for a residential heat pump system which is adapted to use the teachings of my invention.

In FIG. 1, the engine 10 in a preferred embodiment of my invention is a natural gas engine. It is located in an engine compartment 12 which forms a part of a heat pump assembly having a heat pump housing 14. A separate compartment 16 is provided in the housing 14. Surrounding the periphery of the compartment 16 is a refrigerant coil 18. When the system is acting as a heat pump, coil 18 serves as an evaporator. The indoor unit, not shown, has a corresponding coil that acts as a condenser. When the system is acting as a cooler, the functions of the coils are reversed, the coil 18 acting as a condenser and the indoor coil acting as an evaporator.

Figure 2:
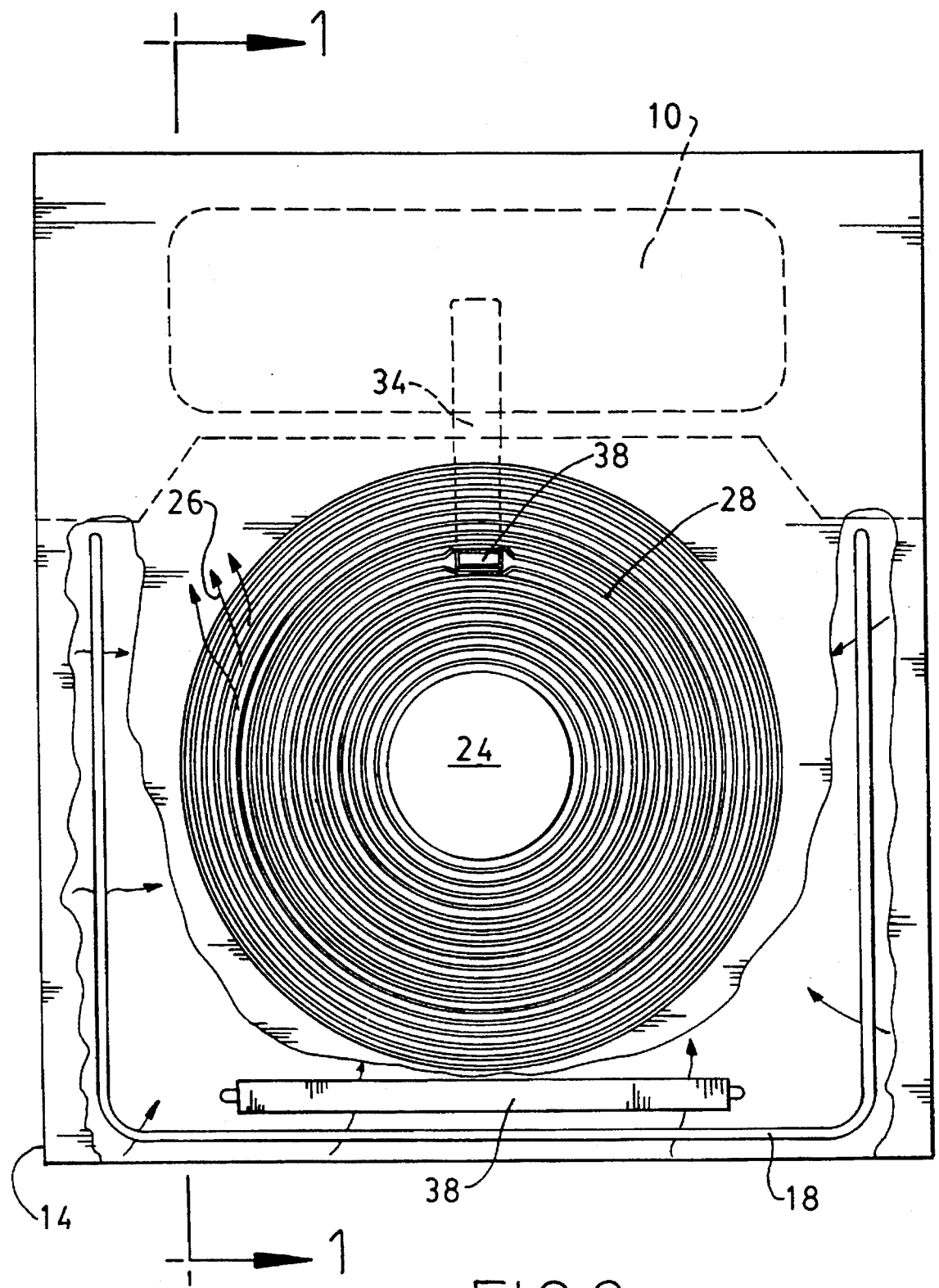
FIG. 2 is a top view of the assembly of FIG. 1.

The side of the housing 14 has an opening for the outdoor air. As the outdoor air enters the compartment 16 through the opening, it passes through the coil and is directed upwardly as shown by the directional arrows 20. At the top of the compartment 16 is a fan having blades 22 rotating in a horizontal plane. An electric fan motor 24 drives the fan blades. The air is discharged vertically upward, as shown at 26, through the fan grill 28. The engine air intake 30 extends to one side of the housing 14 and comprises an intake air duct to supply the fuel air mixture manifold for the engine 10. The engine exhaust system comprises a conduit 32 having a portion 34 that extends horizontally, as shown in FIG. 1, into the chamber 16 at a location downstream from the fan blades 22 and below the location of the grill 28. The conduit portion 34 then extends vertically upward as shown at 36 to direct exhaust gases through an opening in the grill. This can be seen by referring to FIG. 2, the exit for the exhaust gases being identified in FIG. 2 by reference numeral 38. The grill 28 has multiple turns which cover the upper surface of the compartment 16.

The temperature of the exhaust gases is maintained at a higher level since the exhaust gases pass through the warm engine compartment 12 over the extended length of the conduit 32. This reduces condensation in the engine exhaust, especially during engine start-up.

The coolant for the engine passes through an engine radiator 38 located in proximity to the refrigerant coil so that outdoor air may be drawn through the engine radiator by the fan 22.

In most installations, the engine compartment will contain an exhaust gas recuperator 40 through which exhaust gases are passed before the gases enter the conduit 32.

The engine compartment temperature is elevated because of the presence of the engine so the exhaust gases are maintained at an elevated temperature before they are discharged through the opening 36 where the exhaust gases enter the airstream for the air discharged by the fan.

Having described a preferred embodiment of my invention, what I claim and desire to secure by U.S. Letters Patent is:

1. A heat pump assembly comprising an outdoor refrigerant evaporator coil, a heat pump housing having an engine compartment adapted to enclose an internal combustion engine and compressor, said compressor and said evaporator defining in part a refrigerant circuit, an outdoor air entry passageway in said housing, an air fan compartment separate from said engine compartment, an air discharge opening in said fan compartment, an air fan in said fan compartment adapted to move outdoor air across said coil, through said fan compartment and through said air discharge opening;

an engine exhaust duct in said engine compartment extending into said fan compartment on the downstream side of said fan whereby engine exhaust is mixed with outdoor airflow and carried by said outdoor air to the exterior of said heat pump housing whereby exhaust noise, combustion gas, odor and water vapor are dissipated.

2. The combination set forth in claim 1 wherein said fan compartment comprises at least two side walls, said assembly having a refrigerant coil disposed at least at two of said walls, said fan compartment having airflow passageways, said fan being adapted to draw outdoor air across said refrigerant coil and to discharge it in a vertical direction, and engine exhaust gases being discharged from said heat pump assembly in the direction of airflow through said fan whereby the visual signature of said exhaust gases is obscured.

3. The combination as set forth in claim 1 wherein said fan is mounted for rotation in a horizontal plane whereby the outdoor air discharge flow is in a vertical, upward direction.

4. The combination as set forth in claim 2 wherein said fan is mounted for rotation in a horizontal plane whereby the outdoor air discharge flow is in a vertical, upward direction.

5. A heat pump assembly comprising an outdoor refrigerant evaporator coil, a heat pump housing having an engine compartment adapted to enclose an internal combustion engine and compressor, said compressor and evaporator defining in part a refrigerant circuit, an outdoor air entry passageway in said housing, an air fan compartment, separate from said engine compartment, an air discharge opening in said fan compartment, an air fan in said fan compartment adapted to move outdoor air across said coil, through said fan compartment and through said air discharge opening;

a grill extending across said air discharge opening;

an engine exhaust duct in said engine compartment extending into said fan compartment on the downstream side of said fan and said grill whereby engine exhaust is mixed with outdoor airflow and carried by said outdoor air to the exterior of said heat pump housing whereby exhaust noise, combustion gas, odor and water vapor are dissipated.

6. The combination as set forth in claim 5 wherein said fan compartment comprises at least two side walls, said assembly having a refrigerant coil being disposed at least at two of said walls, said fan compartment having airflow passageways, said fan being adapted to draw outdoor air across said refrigerant coil and to discharge it in a vertical direction through said grill, said engine exhaust gases being discharged from said heat pump assembly in the airflow through said fan and said grill whereby the visual signature of said exhaust gases is obscured.

* * * * *